(12) United States Patent
Jou et al.

(10) Patent No.: US 11,956,583 B2
(45) Date of Patent: Apr. 9, 2024

(54) HEADPHONE

(71) Applicant: Merry Electronics Co., Ltd., Taichung (TW)

(72) Inventors: Hung-Uei Jou, Taichung (TW); Ko-Min Wang, Taichung (TW); Chung-Yi Huang, Taichung (TW)

(73) Assignee: Merry Electronics Co., Ltd., Taichung (TW)

( * ) Notice: Subject to any disclaimer, the term of this patent is extended or adjusted under 35 U.S.C. 154(b) by 145 days.

(21) Appl. No.: 17/726,543

(22) Filed: Apr. 22, 2022

(65) Prior Publication Data

US 2023/0345161 A1    Oct. 26, 2023

(51) Int. Cl.
*H04R 1/10* (2006.01)
*G01S 17/04* (2020.01)
*H04R 1/02* (2006.01)

(52) U.S. Cl.
CPC ............ *H04R 1/1008* (2013.01); *G01S 17/04* (2020.01); *H04R 1/1041* (2013.01)

(58) Field of Classification Search
CPC ...... H04R 1/1008; H04R 1/1041; G01S 17/04
USPC ..................................................... 381/74, 334
See application file for complete search history.

(56) References Cited

U.S. PATENT DOCUMENTS

2023/0345162 A1*   10/2023   Hatfield ............... H04R 1/1041

* cited by examiner

*Primary Examiner* — Ammar T Hamid
(74) *Attorney, Agent, or Firm* — JCIPRNET (57) ABSTRACT

Disclosed is a headphone including a headband and two ear cups connected to opposite ends of the headband. Each of the ear cups includes a shell, a front cover, and a light sensor. The shell has an open end. The front cover covers the open end of the shell. The front cover is in a basin form and has a peripheral sidewall and a bottom wall. The light sensor is located on the peripheral sidewall of the front cover. The light sensor includes a light-emitting unit and a light detection unit. When a user wears the headphone, light emitted by the light-emitting unit irradiates a flat portion of a back surface of an ear of the user.

8 Claims, 6 Drawing Sheets

HEADPHONE

BACKGROUND

Technical Field

The disclosure relates to a headphone.

Description of Related Art

As science and technology innovate on a daily basis, development of electronic products is increasing rapid, among which a headphone may serve as a medium for transmitting sound information to a human ear during sound transmission between an electronic device and the human ear.

Currently, many wireless headphones are provided with a power button, a play button, and a pause button due to application requirements. When a user intends to use the headphone, the user may first press the power button to turn on the headphone, and press the play button to play music. Comparatively, when the user stops using the headphone, the user also presses the power button to turn off the headphone, or presses the pause button to temporarily stop music from playing. However, pressing buttons as mentioned above is likely to cause inconvenience to the user in using the headphone.

SUMMARY

The disclosure provides a headphone whose ear cup includes a light sensor to detect whether a user wears the headphone to improve convenience in using the headphone.

The headphone of the disclosure includes a headband and two ear cups connected to opposite ends of the headband. Each of the ear cups includes a shell body, a front cover, and a light sensor. The shell body has an open end. The front cover covers the open end of the shell body. The front cover is in a basin form and has a peripheral sidewall and a bottom wall. The light sensor is located on the peripheral sidewall of the front cover. The light sensor includes a light-emitting unit and a light detection unit. When a user wears the headphone, light emitted by the light-emitting unit irradiates a flat portion of a back surface of an ear of the user.

In an embodiment of the disclosure, the shell body and the front cover together form a first accommodating space. Each of the ear cups further includes a speaker. The speaker is disposed in the first accommodating space. The speaker has a sound outlet surface. The sound outlet surface of the speaker faces the bottom wall.

In an embodiment of the disclosure, each of the ear cups further includes an outer frame. The front cover is located between the shell body and the outer frame. The outer frame includes a frame body part and an extension part. The frame body part covers an outer edge of the peripheral sidewall and is fixed to a portion of the shell body close to the open end. The extension part protrudes and extends in a direction from the frame body part to the bottom wall, and is formed on an inner side of the peripheral sidewall. The extension part has a perforation allowing light emitted by the light sensor to irradiate through the perforation.

In an embodiment of the disclosure, each of the ear cups further includes a mesh. The mesh is sandwiched between the front cover and the outer frame. The mesh has a hole corresponding to the perforation. The light emitted by the light sensor irradiates through the perforation and the hole.

In an embodiment of the disclosure, each of the ear cups further includes a positioning element. The positioning element is engaged with the extension part and abuts a portion around the hole of the mesh. The positioning element has a slot corresponding to the perforation.

In an embodiment of the disclosure, the sound outlet surface of the speaker has a normal direction and a first axis. The first axis passes through a center of the sound outlet surface of the speaker and is parallel to the normal direction. The light sensor has a light emission direction and a second axis. The second axis passes through a center of a light emission surface of the light sensor and is parallel to the light emission direction. The first axis intersects the second axis. An included angle between the first axis and the second axis is less than 110°.

In an embodiment of the disclosure, a distance between a center of the sound outlet surface of the speaker and a center of a light emission surface of the light sensor is less than 60 millimeters.

In an embodiment of the disclosure, each of the ear cups further includes foam. The foam surrounds the outer frame. The foam and the front cover together define a second accommodating space. The front cover has a through hole causing the first accommodating space to be in acoustic communication with the second accommodating space. The first axis and the second axis intersect each other in the second accommodating space.

In an embodiment of the disclosure, the shell body has a side shell and a bottom shell. The open end is located at an edge of the side shell away from the bottom shell. The sound outlet surface of the speaker and the bottom shell are arranged in a non-parallel state.

In an embodiment of the disclosure, when the user wears the headphone, the front cover has a bottom end closest to a chin of the user. An imaginary connecting line between a center of the front cover and the bottom end rotates 120° in a clockwise direction taking the center of the front cover as an origin and defines a region. The light sensor is disposed on the peripheral sidewall of the front cover corresponding to the region, such that a light emission surface of the light sensor faces the flat portion of the back surface of the ear of the user.

Based on the foregoing, in the headphone of the disclosure, whether the user is wearing the headphone can be detected through the sensing technology of the light sensor, which serves as a basis for the headphone to automatically play or pause music. Further, when the user wears the headphone, by the light sensor located on the peripheral sidewall of the front cover, light emitted by the light-emitting unit irradiates the flat portion of the back surface of the ear of the user. Accordingly, accuracy of sensing can be improved to prevent erroneous determination.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
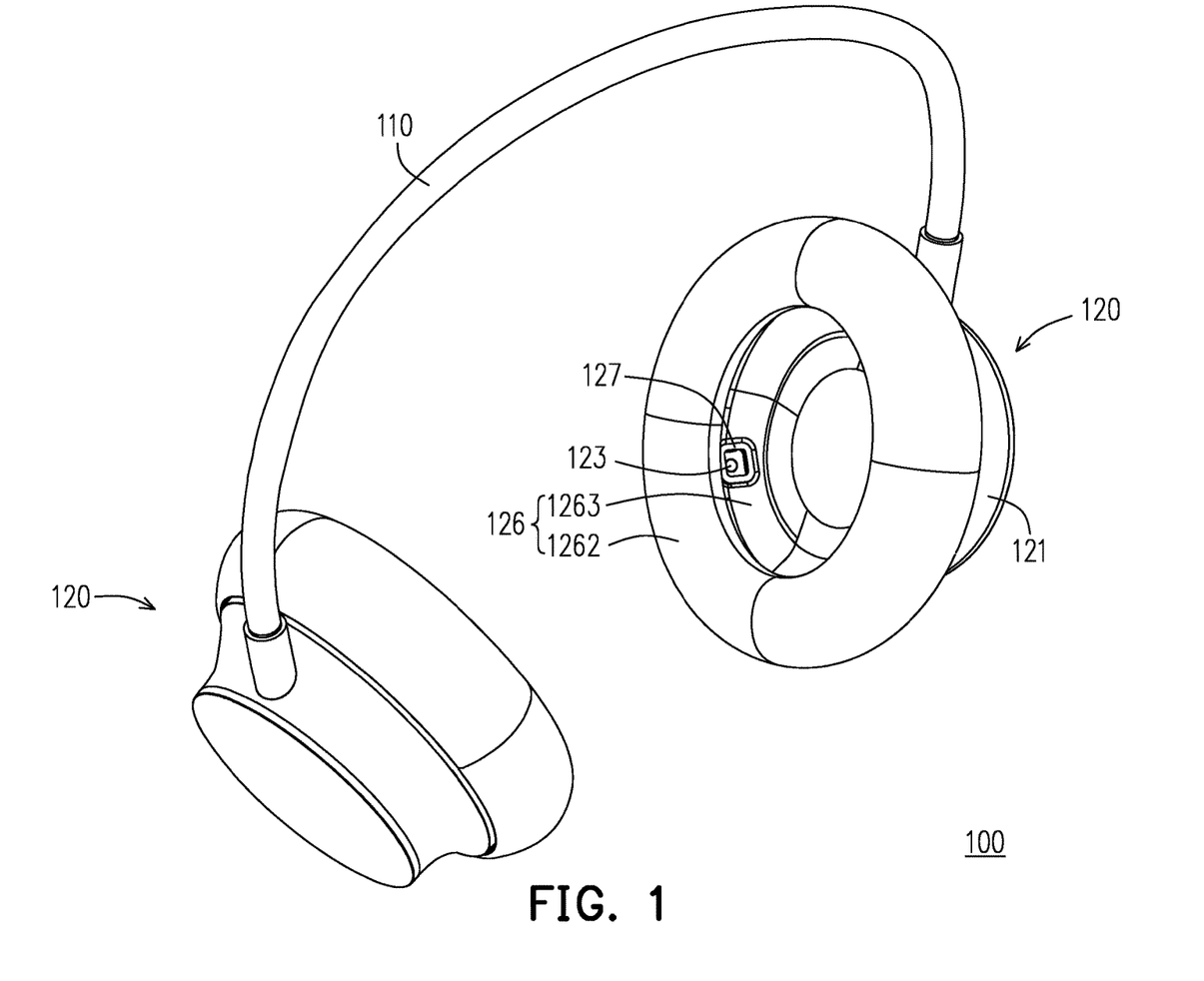
FIG. 1 is a schematic perspective view of a headphone according to an embodiment of the disclosure.

FIG. 1 is a schematic perspective view of a headphone according to an embodiment of the disclosure. With reference to FIG. 1, a headphone 100 of this embodiment includes a headband 110 and two ear cups 120 connected to opposite ends of the headband 110. In this embodiment, the headphone 100 is a wireless headphone, for example but not limited thereto. Since the ear cups of the left and right ears have actually the same component composition, the ear cup of the left ear (that is, the ear cup on the right side of the figure) will be taken as an example for the following description.

Figure 2:
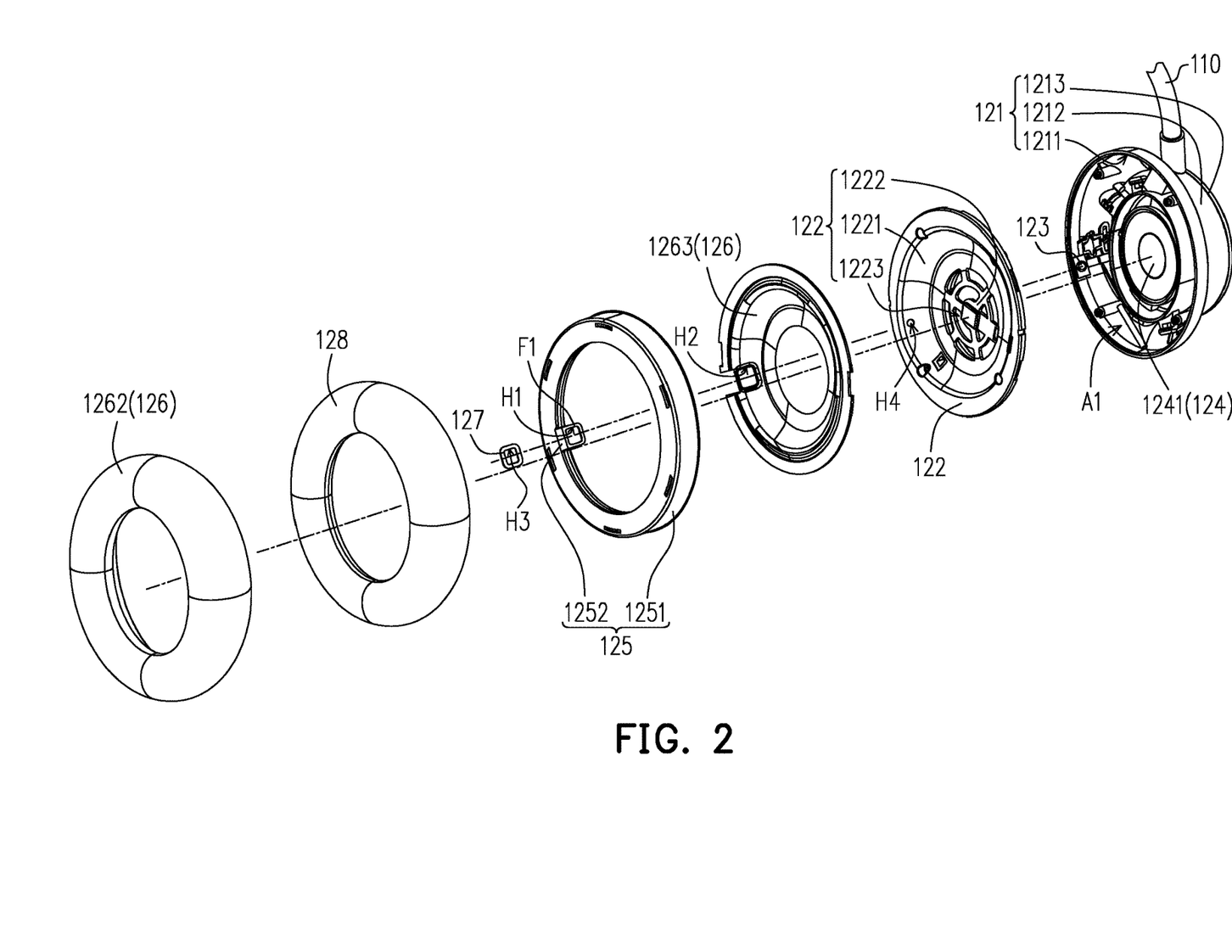
FIG. 2 is an exploded view of the ear cup of FIG. 1.
Figure 3:
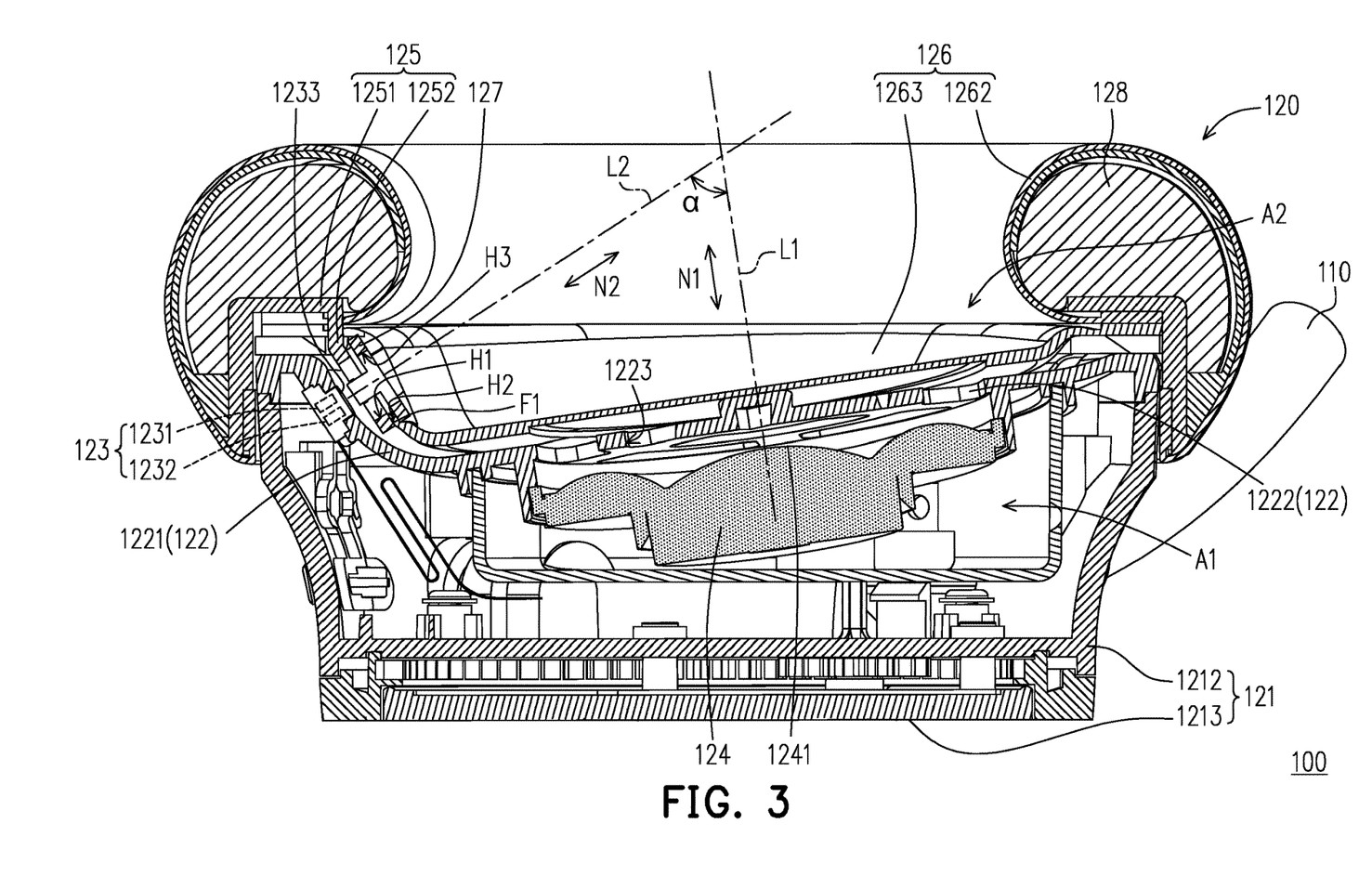
FIG. 3 is a schematic cross-sectional view of the ear cup of FIG. 2.

FIG. 2 is an exploded view of the ear cup of FIG. 1. FIG. 3 is a schematic cross-sectional view of the ear cup of FIG. 2. With reference to FIG. 1 to FIG. 3, in this embodiment, the ear cup 120 includes a shell body 121, a front cover 122, and a light sensor 123. The shell body 121 has an open end 1211. The front cover 122 covers the open end 1211 of the shell body 121. The front cover 122 is in a basin form and has a peripheral sidewall 1221 and a bottom wall 1222. The light sensor 123 is located on the peripheral sidewall 1221 of the front cover 122. For example, the light sensor 123 is embedded in a hole H4 of the peripheral sidewall 1221, but the disclosure is not limited thereto.

Specifically, in this embodiment, the shell body 121 and the front cover 122 together form a first accommodating space A1. The ear cup 120 further includes a speaker 124. The speaker 124 is disposed in the first accommodating space A1. The speaker 124 has a sound outlet surface 1241. The sound outlet surface 1241 of the speaker 124 faces the bottom wall 1222.

In this embodiment, the ear cup 120 further includes an outer frame 125. The front cover 122 is located between the shell body 121 and the outer frame 125. The outer frame 125 includes a frame body part 1251 and an extension part 1252. The frame body part 1251 covers an outer edge of the peripheral sidewall 1221 and is fixed to a portion of the shell body 121 close to the open end 1211. The extension part 1252 protrudes and extends in a direction from the frame body part 1251 to the bottom wall 1222, and is formed on an inner side of the peripheral sidewall 1221. The extension part 1252 has a perforation H1.

To be specific, with reference to FIG. 3, in this embodiment, the light sensor 123 includes a light-emitting unit 1231 and a light detection unit 1232. Light emitted by the light sensor 123 through the light-emitting unit 1231 irradiates through the perforation H1. In addition, the light sensor 123 may receive the reflected light through the light detection unit 1232. In this embodiment, light emitted by the light-emitting unit 1231 is infrared light or laser light, for example but not limited thereto. Here, the light-emitting unit 1231 and the light detection unit 1232 are schematically shown by broken lines, and adequate suggestion and implementation explanation of their operation and implementation may be obtained from the related technical fields, and thus will not be repeated.

Figure 4:
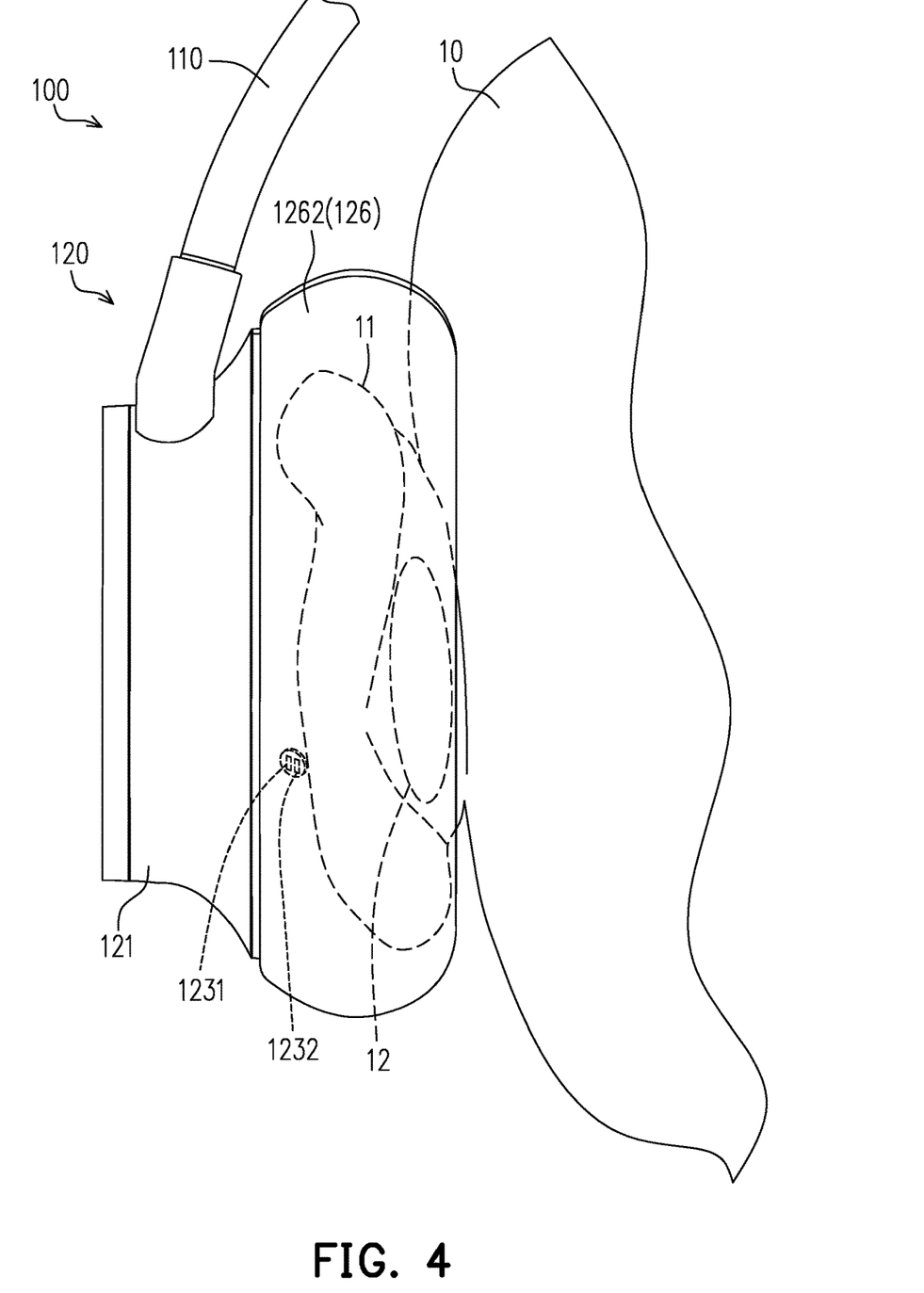
FIG. 4 is a schematic view of the headphone of FIG. 3 being worn by a user.

FIG. 4 is a schematic view of the headphone of FIG. 3 being worn by a user. With reference to FIG. 4, when a user 10 wears the headphone 100, light emitted by the light-emitting unit 1231 irradiates a flat portion 12 of a back surface of an ear 11 of the user 10 to improve accuracy of sensing by the light sensor 123. This prevents light emitted by the light-emitting unit 1231 from irradiating the head outside the ear 11, which is likely to affect accuracy of sensing due to the uneven contour of the head.

Accordingly, an infrared signal is emitted by the light-emitting unit 1231 and received by the light detection unit 1232 to determine whether the user 10 wears the headphone 100, which serves as a basis for the headphone 100 to automatically play or pause music to improve convenience in using the headphone 100.

With reference to FIG. 1 to FIG. 3, in this embodiment, the ear cup 120 further includes a mesh assembly 126 and foam 128. The foam 128 surrounds the outer frame 125. The mesh assembly 126 has a first mesh 1262, a second mesh 1263, and a hole H2. The hole H2 corresponds to the perforation H1 of the extension part 1252. The first mesh 1262 of the mesh assembly 126 is adapted to wrap the foam 128. The second mesh 1263 of the mesh assembly 126 is at least sandwiched between the front cover 122 and the outer frame 125. Nonetheless, the disclosure is not limited thereto.

In this embodiment, the extension part 1252 includes a positioning part F1 located on the periphery of the perforation H1. In the mesh assembly 126A, a part of the second mesh 1263 (that is, a portion around the hole H2) extends to the positioning part F1 of the extension part 1252. The positioning part F1 of the extension part 1252 may be coated with an adhesive layer, for example glue, to be fixed with the portion around the hole H2 of the mesh assembly 126 to maintain the relative positions of the hole H2 of the mesh assembly 126 and the light sensor 123, and the disclosure is not limited thereto. Accordingly, light emitted by the light-emitting unit 1231 can directly irradiate the flat portion 12 of the back surface of the ear 11 of the user 10 without passing through any shielding object (for example, a mesh) to improve accuracy of sensing by the light sensor 123.

Further, the ear cup 120 of this embodiment further includes a positioning element 127. by the positioning element 127 that is engaged with the positioning part F1 of the extension part 1252 and abuts a portion around the hole H2 of the mesh assembly 126, maintenance of the relative positions of the hole H2 and the light sensor 123 is enhanced. Nonetheless, the disclosure is not limited thereto. In this embodiment, the positioning element 127 has a slot H3 corresponding to the performance H1 of the extension part 1252. Accordingly, light emitted by the light sensor 123 may irradiate through the perforation H1, the hole H2, and the slot H3.

With reference to FIG. 2, in this embodiment, the shell body 121 has a side shell 1212 and a bottom shell 1213. The open end 1211 is located at an edge of the side shell 1212 away from the bottom shell 1213. With reference to FIG. 3, in this embodiment, the sound outlet surface 1241 of the speaker 124 and the bottom shell 1213 are arranged in a non-parallel state. With this design, the sound generated by the inclined speaker 124 can be transmitted more smoothly to an ear canal of the user.

With continued reference to FIG. 3, in this embodiment, the sound outlet surface 1241 of the speaker 124 has a normal direction N1 and a first axis L1 passing through a center of the sound outlet surface 1241 of the speaker 124 and being parallel to the normal direction N1. The light sensor 123 has a light emission direction N2 and a second axis L2 passing through a center of a light emission surface 1233 of the light sensor 123 and being parallel to the light emission direction N2. The first axis L1 and the second axis L2 intersect. There is an included angle α between the first axis L1 and the second axis L2, and the included angle α is less than 110°, so that the light emission surface 1233 of the light sensor 123 faces the flat portion 12 of the back surface of the ear 11 of the user 10 shown in FIG. 4.

To be more specific, in this embodiment, the foam 128 and the front cover 122 together define a second accommodating space A2. The front cover 122 has a through hole 1223 causing the first accommodating space A1 to be in acoustic communication with the second accommodating space A2. The first axis L1 and the second axis L2 intersect each other in the second accommodating space A2.

Figure 5:
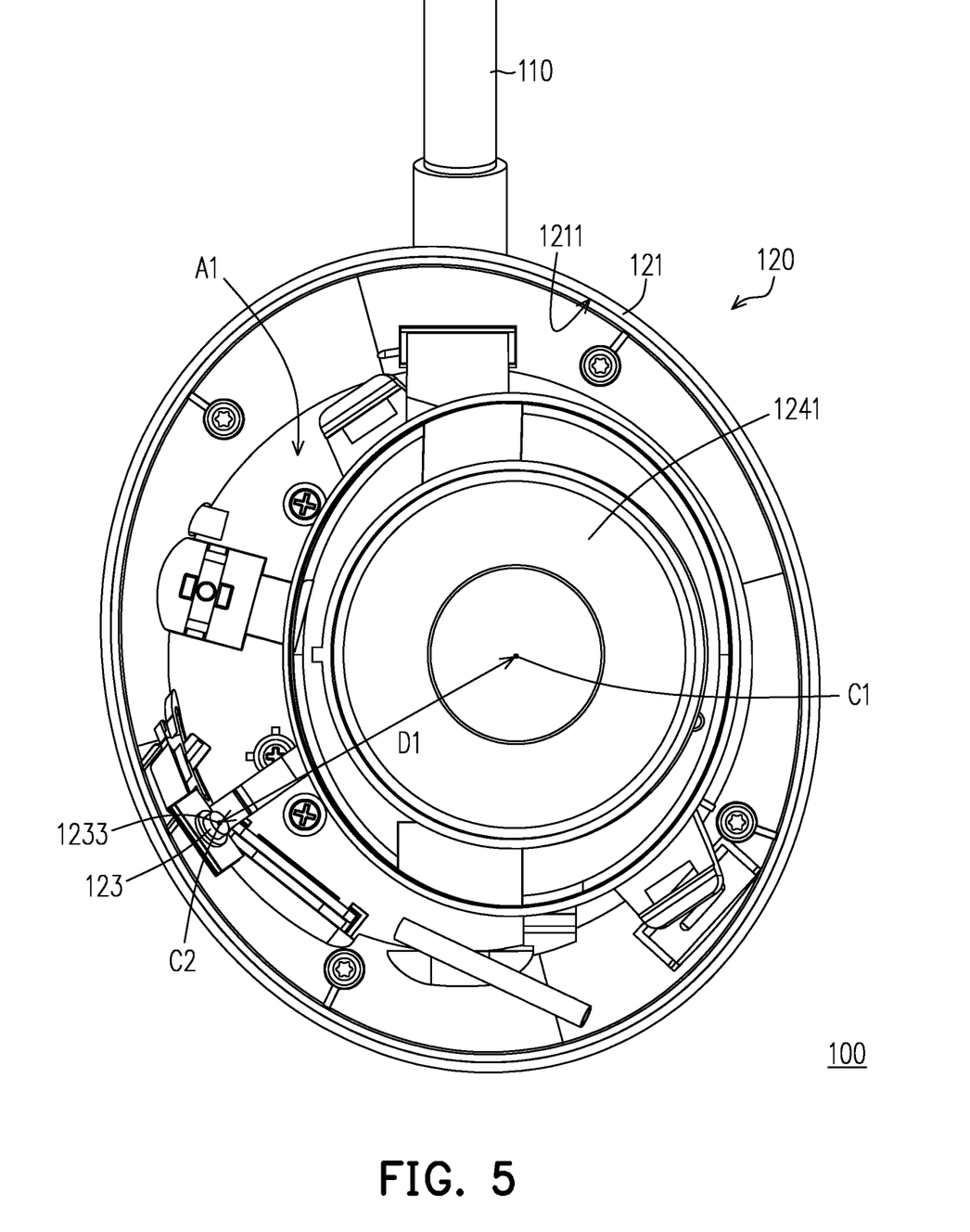
FIG. 5 and FIG. 6 are each a schematic side view of the ear cup of FIG. 3.
Figure 6:
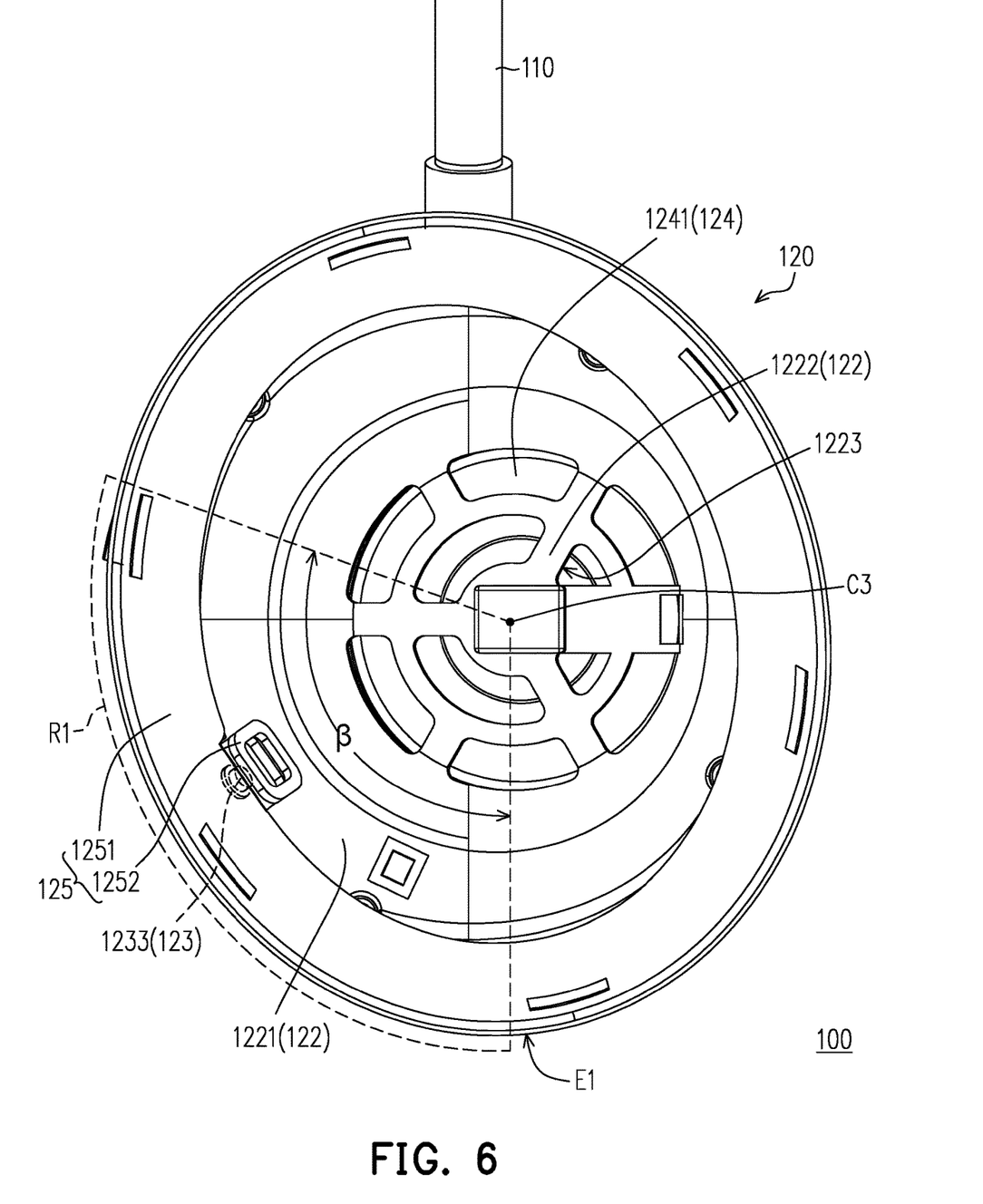

FIG. 5 and FIG. 6 are each a schematic side view of the ear cup of FIG. 3. With reference to FIG. 5 first, in this embodiment, there is a distance D1 between a center C1 of the sound outlet surface 1241 of the speaker 124 and a center C2 of the light emission surface 1233 of the light sensor 123, and the distance D1 is less than 60 millimeters, so that the light sensor 123 can be close to the flat portion 12 of the back surface of the ear 11 of the user 10 shown in FIG. 4. In order to clearly show the internal structure of the ear cup, components such as the front cover 122, the outer frame 125, and the foam 128 are omitted in FIG. 5.

With reference to FIG. 6, when the user 10 shown in FIG. 4 wears the headphone 100, the front cover 122 has a bottom end E1 closest to a chin 13 of the user 10. An imaginary connecting line between a center C3 of the front cover 122 and the bottom end E1 rotates an angle β in a clockwise direction taking the center C3 of the front cover 122 as an origin and defines a region R1. In this embodiment, the angle β is 120°, for example but not limited thereto. In terms of the ear cup 120 of the left ear in FIG. 6, the clockwise direction is a direction of rotation upward from the bottom end E1 to the back of the head of the user 10, for example but not limited thereto. In this embodiment, the light sensor 123 is disposed on the peripheral sidewall 1221 of the front cover 122 corresponding to the rotation region R1, so that the light emission surface 1233 of the light sensor 123 faces the flat portion 12 of the back surface of the ear 11 of the user 10 shown in FIG. 4. In order to clearly show the internal structure of the ear cup, some components are drawn with broken lines in FIG. 6.

In summary of the foregoing, in the headphone of the disclosure, when the user wears the headphone, light emitted by the light-emitting unit irradiates the flat portion of the back surface of the ear of the user, and the light detection unit receives an infrared signal to determine that the user has worn the headphone, which serves as a basis for the headphone to automatically play music. Comparatively, when the user takes down the headphone, the light detection unit does not receive an infrared signal to determine that the user does not wear the headphone, which serves as a basis for the headphone to automatically pause music. On the other hand, the mesh of the ear cup has the hole. The hole is aligned with the light emission surface of the light sensor, so that light emitted by the light-emitting unit can directly irradiate the flat portion of the back surface of the ear of the user without passing through any shielding object to improve accuracy of sensing by the light sensor. Further, the extension part of the outer frame has the perforation. The perforation corresponds to the hole of the mesh. By the positioning part around the perforation of the extension part that is fixed with the portion around the hole, the relative positions of the hole of the mesh and the light sensor are maintained. Furthermore, by utilizing the positioning element that is engaged with the positioning part of the extension part and abuts the portion around the hole of the mesh, maintenance of the relative positions of the hole and the light sensor is enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A headphone comprising:
a headband; and
two ear cups connected to opposite ends of the headband, each of the ear cups comprising:
a shell body having an open end;
a front cover covering the open end of the shell body, the front cover being in a basin form and having a peripheral sidewall and a bottom wall; and
a light sensor located on the peripheral sidewall of the front cover, the light sensor comprising a light-emitting unit and a light detection unit,
wherein when a user wears the headphone, light emitted by the light-emitting unit irradiates a flat portion of a back surface of an ear of the user,
the shell body and the front cover together form a first accommodating space, each of the ear cups further comprises a speaker, the speaker is disposed in the first accommodating space, the speaker has a sound outlet surface, and the sound outlet surface of the speaker faces the bottom wall,
the shell body has a side shell and a bottom shell, the open end is located at an edge of the side shell away from the bottom shell, and the sound outlet surface of the speaker and the bottom shell are arranged in a non-parallel state.

2. The headphone of claim 1, wherein each of the ear cups further comprises an outer frame, the front cover is located between the shell body and the outer frame, the outer frame comprises a frame body part and an extension part, the frame body part covers an outer edge of the peripheral sidewall and is fixed to a portion of the shell body close to the open end, the extension part protrudes and extends in a direction from the frame body part to the bottom wall, and is formed on an inner side of the peripheral sidewall, the extension part has a perforation allowing light emitted by the light sensor to irradiate through the perforation.

3. The headphone of claim 2, wherein each of the ear cups further comprises a mesh, the mesh is sandwiched between the front cover and the outer frame, the mesh has a hole corresponding to the perforation, and the light emitted by the light sensor irradiates through the perforation and the hole.

4. The headphone of claim 3, wherein each of the ear cups further comprises a positioning element, the positioning element is engaged with the extension part and abuts a portion around the hole of the mesh, and the positioning element has a slot corresponding to the perforation.

5. The headphone of claim 2, wherein the sound outlet surface of the speaker has a normal direction and a first axis passing through a center of the sound outlet surface of the speaker and being parallel to the normal direction, the light sensor has a light emission direction and a second axis passing through a center of a light emission surface of the light sensor and being parallel to the light emission direction, the first axis intersects the second axis, and an included angle between the first axis and the second axis is less than 110°.

6. The headphone of claim 1, wherein a distance between a center of the sound outlet surface of the speaker and a center of a light emission surface of the light sensor is less than 60 millimeters.

7. The headphone of claim 5, wherein each of the ear cups further comprises foam, the foam surrounds the outer frame, the foam and the front cover together define a second accommodating space, the front cover has a through hole causing the first accommodating space to be in acoustic communication with the second accommodating space, and the first axis and the second axis intersect each other in the second accommodating space.

8. The headphone of claim 1, wherein when the user wears the headphone, the front cover has a bottom end closest to a chin of the user, an imaginary connecting line between a center of the front cover and the bottom end rotates 120° in a clockwise direction taking the center of the front cover as an origin and defines a region, the light sensor is disposed on the peripheral sidewall of the front cover corresponding to the region, such that a light emission surface of the light sensor faces the flat portion of the back surface of the ear of the user.

* * * * *